United States Patent [19]
Holcomb et al.

[11] 3,855,534
[45] Dec. 17, 1974

[54] APPARATUS FOR PROVIDING POWER TO PORTABLE RADIO TRANSMITTERS

[75] Inventors: Jack N. Holcomb, Galt Towers, Ocean Dr.; Hans D. Sylten, both of Fort Lauderdale, Fla.

[73] Assignee: said Holcomb, by said Sylten

[22] Filed: Apr. 23, 1973

[21] Appl. No.: 353,495

[52] U.S. Cl. ............... 325/118, 325/16, 325/119, 325/361, 325/492
[51] Int. Cl. ............................................. H04b 5/06
[58] Field of Search ............ 325/111, 118, 356, 119, 325/361, 352–354, 492, 16; 320/2, 7

[56] References Cited
UNITED STATES PATENTS

| | | | |
|---|---|---|---|
| 3,105,938 | 10/1963 | Onnigian et al. | 325/111 |
| 3,305,779 | 2/1967 | Errichiello | 325/111 |
| 3,718,848 | 2/1973 | Hines | 320/7 |

*Primary Examiner*—Robert L. Griffin
*Assistant Examiner*—Marc E. Bookbinder

[57] ABSTRACT

This is a method and apparatus for providing power to portable radio transmitters in which a unique system of battery clips is employed, together with switching capability in order to provide maximum utilization of different types of batteries and full utilization of available battery power, characterized particularly by interchangeability and cross-switching from series to parallel arrangement for multiple batteries.

2 Claims, 6 Drawing Figures

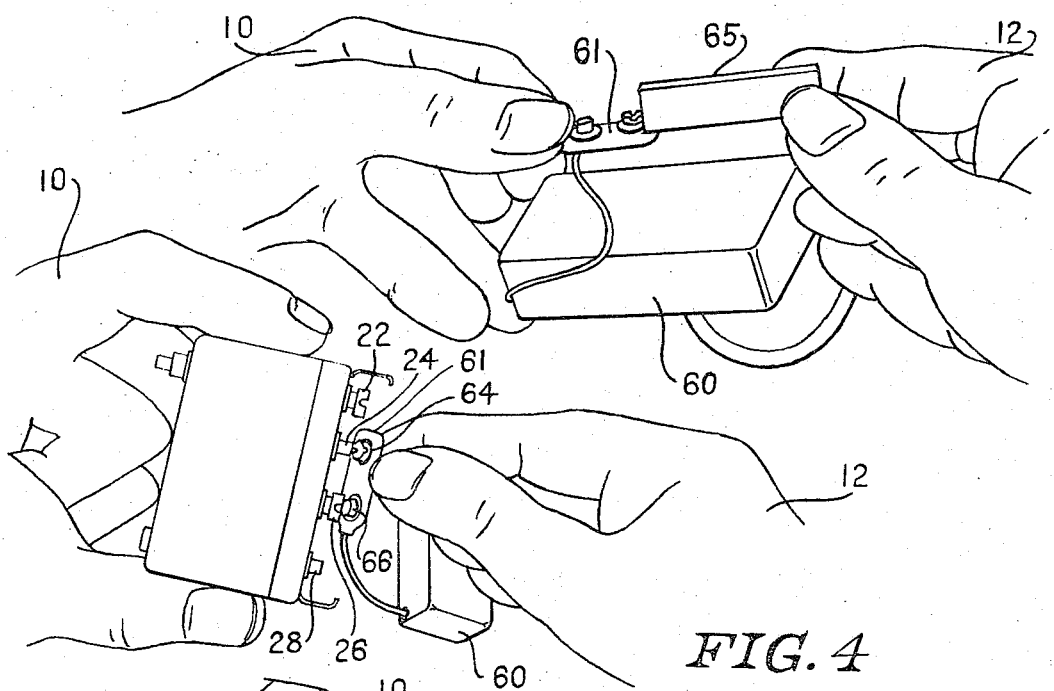
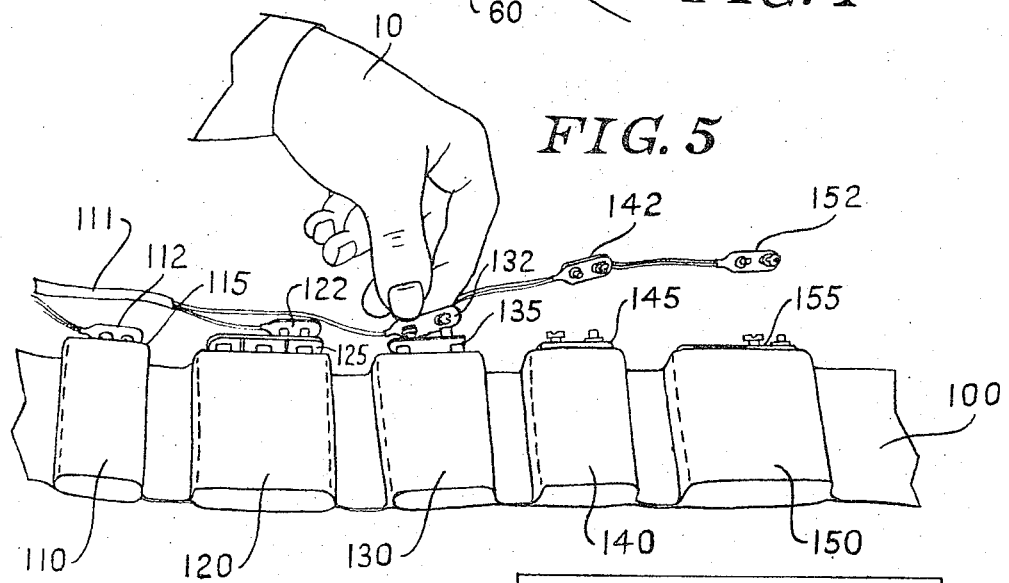
FIG. 4
FIG. 5
FIG. 6

3,855,534

APPARATUS FOR PROVIDING POWER TO PORTABLE RADIO TRANSMITTERS

CROSS REFERENCE TO RELATED PATENT APPLICATIONS

There are no related patent applications filed by us.

BACKGROUND OF THE INVENTION

1. Field of the Invention

This invention is in the general field of power sources for portable radio devices, particularly transmitters, but also, receivers, or the like, and more particularly relates to a novel method and apparatus for maximum utilization of a variety of different types of batteries, for a single radio apparatus.

2. Description of the Prior Art

There are numerous battery packages of one type and another on the market and none in the art to be adapted to use with various types of radio devices.

There are several different types of batteries for such purpose and such batteries easily employ unique connecting means for insertion in conjunction with the radio device. None of these, however, features built-in battery clips having the availability for cross utilization of different types of batteries and none of these incorporates the method of alternate switching for extended battery life when batteries become weak. Therefore, in this field the prior art does not exist.

SUMMARY OF THE INVENTION

There are many different radio receivers and particularly radio transmitters used for a variety of purposes, including intelligence purposes for police and similar organizations.

One of the greater deficiencies of such receivers and transmitters, but most importantly, transmitters, is that they must be held to a minimum size and, at the same time, have sufficient power to accomplish the necessary transmitting range.

The range and versatility of the transmitter is, to a large extent, dependent upon the batteries, and frequently, agents using such transmitters are in isolated areas where suitable battery supplies are not immediately available. Under such circumstances, transmission can fail at the time when it is most desired.

It is quite common for manufacturers of such equipment to provide special batteries, particularly such batteries as mercury cells, and the like. In general, such cells, although giving relatively long life, are not always readily available and in many urban areas are totally unavailable and completely out of the question in rural areas.

In some instances, manufacturers have provided a wire with clips to clip onto a standard nine-volt battery, such as transistor batteries, which are generally available for emergency use. Such batteries give relatively short transmission time and, also, the option of attaching a clip and wires from the transmitter becomes cumbersome and such wires can frequently become disengaged.

We have devised a method and apparatus by which virtually any type common battery may be utilized with such a transmitter, and additionally, we have provided a method and apparatus by which, through special switching, the life of common batteries is sometimes increased for short, but often vital, transmission time beyond the normal battery life.

We have accomplished this by building a special clip arrangement into the base of the transmitter itself and provided in our method means for attaching one or two standard nine-volt batteries, such as transistor batteries, or the like; by which a rechargeable battery source may be clipped onto the same set of clips; and by which alternate batteries, such as mercury cells, penlight cells, and the like, the exact designation of which will be known to those skilled in the art may be used.

Likewise, by the same arrangement, a larger or extended series of batteries may be utilized. For example, batteries carried by a belt upon the person of the individual utilizing the transmitter and connected thereto by a clip harness may give greatly extended life.

We have provided for the utilization of either one or two nine-volt snap-on batteries and our method has further been arranged to provide a means for longer battery life than would otherwise be possible by means of a special parallel circuit between the two batteries and the radio unit with a method for switching from the parallel to a series circuit between the two batteries in order to provide an extended life when each of the batteries has been exhausted to approximately half of its original strength.

It is an object of this invention to provide a method and apparatus for connecting battery units directly to a miniature radio transmitter without intervening battery harnesses;

It is a further object of this invention to provide a method and apparatus for the utilization of numerous types of battery packages by direct connection to the built-in clips of such transmitter.

The foregoing and other objects and advantages of this invention will be understood by those skilled in this art by reading the Description of a Preferred Embodiment which follows in conjunction with the attached drawings.

BRIEF DESCRIPTION OF THE DRAWINGS

FIG. 4 illustrates other battery packs including the rechargeable battery pack and battery pack utilizing standard flashlight cells for connection to the same transmitter;

FIG. 5 illustrates a body belt containing the transmitter and a series of battery packages; and FIG. 6 is a schematic view showing the alternate switching arrangements for switching from series to parallel wiring with the transmitter.

DESCRIPTION OF A PREFERRED EMBODIMENT

Figure 1:
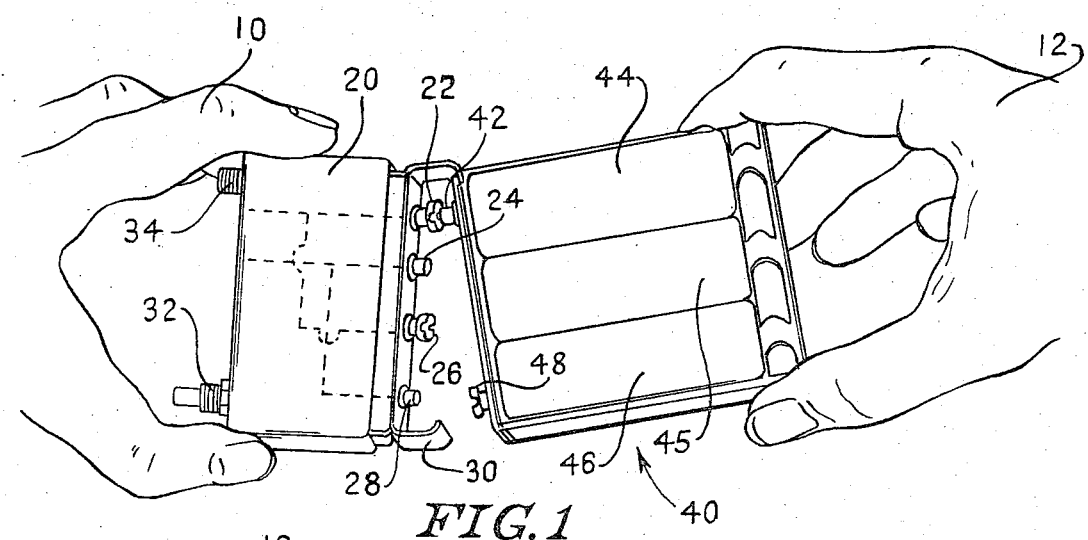
FIG. 1 is a perspective of the miniature radio transmitter from the base showing battery clips adaptable to be used in the method of this invention.

The method of this invention encompasses the first step of providing a multiplicity of battery clips in conjunction with a radio transmitter preferably attached to the base thereof; providing a protracting battery pack to connect to at least two of said clips and suitable to contain different types of batteries aggragating the desired voltage range; and the providing of alternate battery arrangements, such as standard nine-volt transistor radio batteries.

Careful attention to the drawings will show that the radio transmitter (details are known to those skilled in the art) has been provided with four battery clips. Two of the clips are positive and two negative standard terminal matching clips and are so spaced that two standard nine-volt batteries may be clipped thereon as shown particularly in FIG. 2.

By referring to the schematic wiring diagram which illustrates a preferred wiring, it will be seen that two batteries connected in the condition in which the diagram is shown will be running in parallel thus delivering to the transmitter, nine-volts, which is approximately the desired voltage.

It will further be observed that upon switching the pole double throw switch that the two batteries will now be placed in series. Thus when the battery power is effectively reduced by usage in the parallel condition, the final remaining battery power may be utilized, since while each battery would be less than sufficient for proper transmission, the two in series will give a short additional period for transmission and thus enable maximum transmission life from the batteries, together with the all-important extra time which may be required to complete a transmission.

By reference to all of the drawings, there will be seen two hands, generally 10 and 12, which are placed in the drawings for the purpose of illustrating the ease and actual function of operating under the conditions indicated.

The first elements indicated in FIG. 1 are the transmitting (or receiving) unit, generally 20, the details of which are known to those skilled in the art, and are not repeated here. The power for such unit is provided through customary wiring and in this particular method and apparatus, is provided by attachment to two or four, as the case may be from time to time, of the battery clip units 22, 24, 26 and 28.

A battery pack unit 40, containing in this case three special rechargeable batteries, or the like 44, 45 and 46, has provisions within it (not shown) in which the three batteries are connected in series to one another. Thus one of the terminals from this unit 42 will be one of the poles of the entire three batteries in series, and the other connecting unit 48 will be the other pole.

In this case, it is so illustrated that the pole 48 will clip to the matching connector 28 and the pole 42 will connect to the matching connector 22. Thus to engage the special battery pack with the radio unit, these are merely snapped together and are further held in position by the clips 30, which detachably connect the battery pack with the radio unit.

Figure 2:
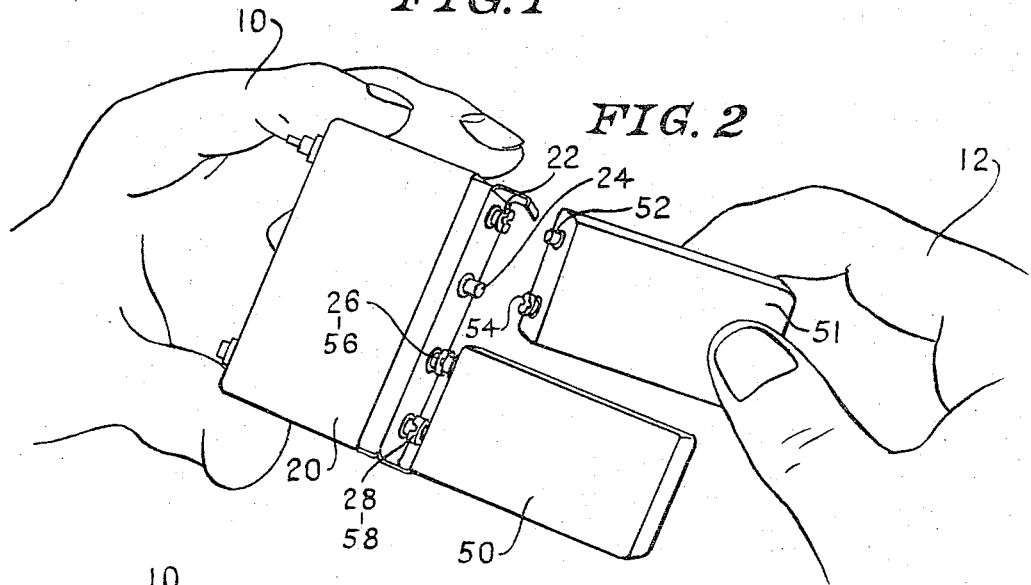
FIG. 2 shows the transmitter of FIG. 1 attached to two standard nine-volt batteries.

FIG. 2 illustrates the potential of connecting two standard nine-volt transistor batteries 50 and 51 to the same radio unit in lieu of the special battery pack 40 previously shown. In this case, it will be noted that the battery clip connectors 52 and 54 on nine-volt battery 51 will snap on to the radio unit clips 22 and 24, and the clip arrangements 56 and 58 will snap on to the terminals 26 and 28. In the illustration shown these are joined, and have been labeled as 26–56 and 28–58.

Figure 3:
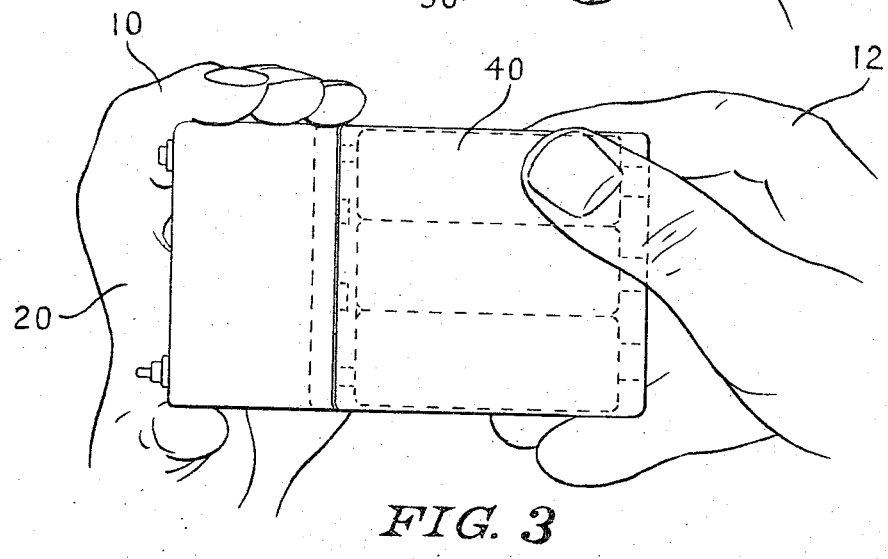
FIG. 3 illustrates the attachment of special battery pack for mercury cells or rechargeable cells to the transmitter of FIG. 1.

The illustration in FIG. 3 is a representation of the completely joined battery pack of 40 with the radio unit of 20.

FIG. 4 shows more particularly a further alternative arrangement by which a battery 60 having a lead connected to a pair of battery clips 61 may be prepared for connection to the transmitter unit 20. In this case, the battery protective covering 65 is removed from the clips and the unit is now ready to be joined to the radio unit 20.

The second portion of FIG. 4 shows the actual connection as made between the battery cable clips 66 and 64 and the radio clips 24 and 26. This illustration further shows the versatility of the wiring diagram which is described in detail in FIG. 6 wherein any of the two positive and any of the two negative terminals on the transmitter itself may be utilized in view of the wiring diagram which, as explained, will be described below.

Understanding that the cable as indicated in FIG. 4, or a like cable with a clip unit 61, may be attached to the transmitter power connectors, a battery pack, such as illustrated in FIG. 5, which may be worn upon the body of a user as a belt, may be utilized. In this case, it is to be observed that various pouches 110, 120, 130, 140 and 150 are provided having appropriate battery units, or the like, 115, 125, 135, 145 and 155.

The take-off harness 111 is suitably provided with connectors 112, 122, 132, 142 and 152 to connect as may be desired to one or more of the various battery units provided.

In this manner, an almost indefinite life can be provided.

Turning attention now to FIG. 6, the very unique switching arrangement we have provided is indicated. This is particularly desirable as previously indicated for those cases where the small standard nine-volt transistor batteries are used. It will be observed that the two batteries connect through the two sets of terminals in parallel, but a switching arrangement as indicated in FIG. 6 is provided so that when the switching units are in the condition indicated by the dotted connecting lines rather than the straight connecting lines, the two batteries are obviously in series. In this condition, then, the radio is now receiving the power through the batteries in series and thus when two nine-volt batteries have been exhausted to the point where they are not providing adequate voltage for actual transmission or receipt, that the switching arrangement will multiply the voltage in such manner that additional usage and transmission can be achieved.

While the embodiment of this invention shown and described is fully capable of achieving the objects and advantages desired, it is to be understood that such embodiment has been shown and described for illustrative purposes only and not for purposes of limitation.

We claim:

1. The combination of an attachable power supply with portable radio apparatus, comprising:
   a. a battery receptacle case having a plurality of batteries,
   b. a portable radio apparatus having a battery attachment section with a plurality of parallel connected positive terminals and parallel connected negative terminals,
   c. the battery receptacle case having means for attachment to the radio apparatus adjacent the positive and negative terminals,
   d. positive electrical connecting means mounted on the battery receptacle case for providing direct attachment to one of the positive terminals of the radio apparatus, e. negative electrical connecting means mounted on the battery receptacle case for providing direct attachment to one of the negative terminals of the radio apparatus, f. electrical connecting means integral with the battery case for interconnecting said plurality of batteries electrically with the positive and negative electrical connecting means on the battery receptacle case, g. the electrical connecting means including switch means having a first position for electrically connecting the plurality of batteries in parallel with the positive and negative electrical means of the battery receptacle case, h. the switch means having a second position for alternately electrically connecting the plurality of batteries in series with the positive and negative electrical connecting means of the battery case, whereby the signal emanating from the radio apparatus can be maintained at a satisfactory signal level for a limited period of time after the batteries become weak and supply insufficient power to the radio apparatus when they are connected in parallel.

2. The combination of an attachable power supply with a portable radio apparatus as set forth in claim 1, wherein:

a. the battery receptacle case is a belt having a plurality of pouches, each of which receives a battery.

* * * * *